April 22, 1924.
T. C. WORMLEY
1,491,506
FUMIGATOR AND INSECT DESTROYER
Filed June 23, 1923
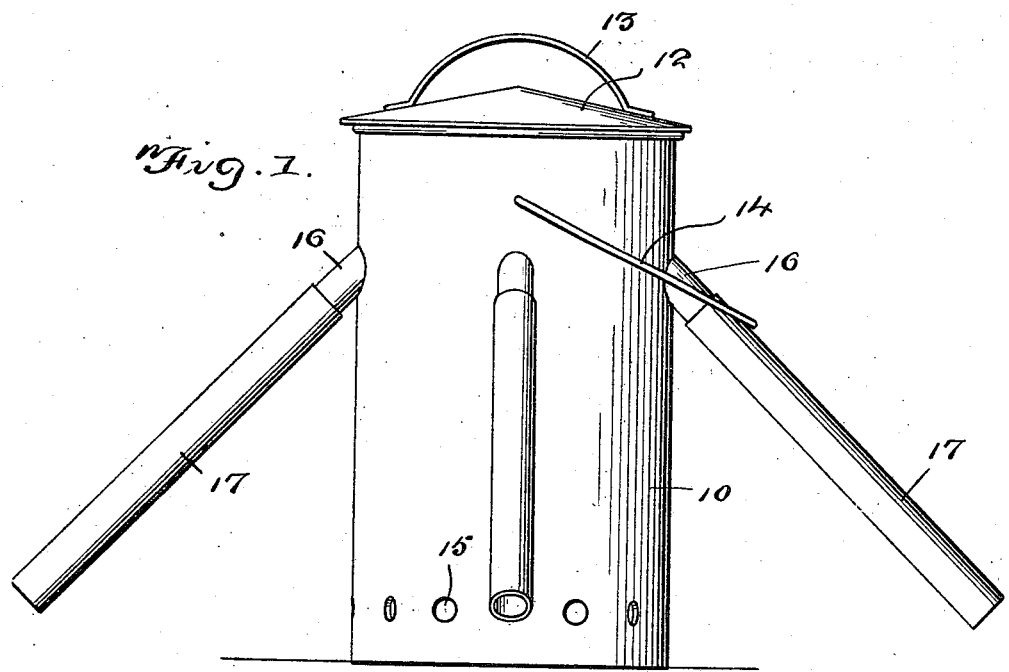
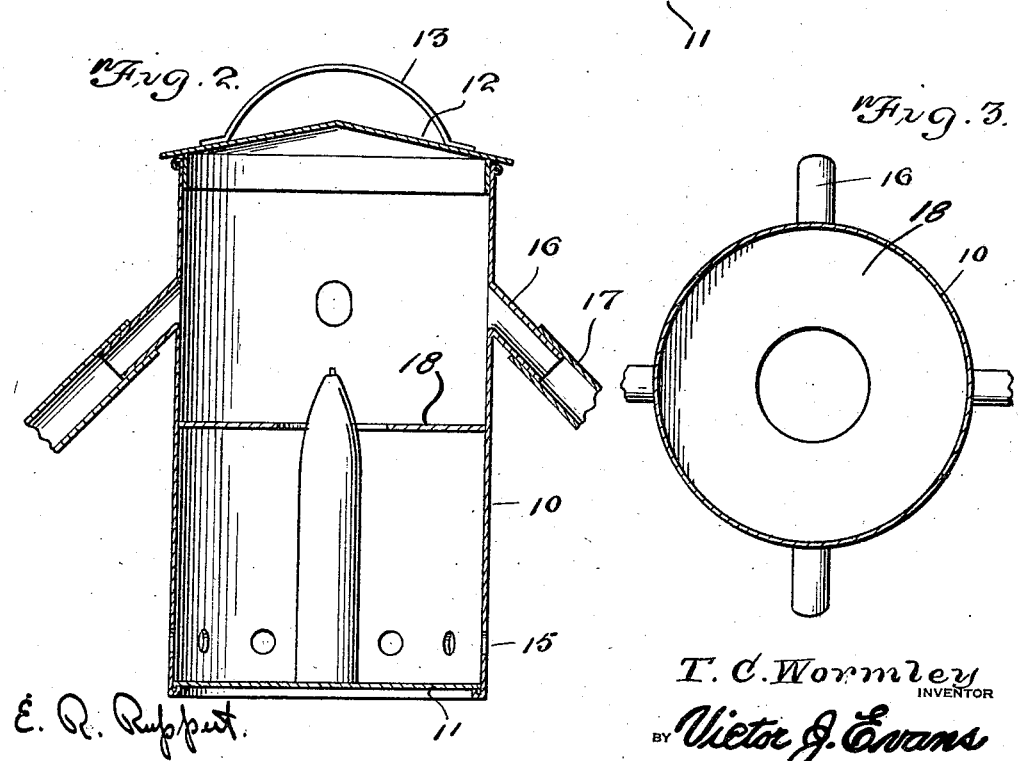
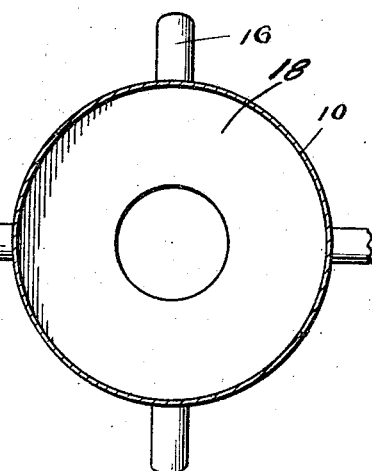

Patented Apr. 22, 1924.

1,491,506

UNITED STATES PATENT OFFICE.

THOMAS C. WORMLEY, OF SAN ANTONIO, TEXAS, ASSIGNOR OF ONE-HALF TO H. M. PRUE, OF SAN ANTONIO, TEXAS.

FUMIGATOR AND INSECT DESTROYER.

Application filed June 23, 1923. Serial No. 647,345.

*To all whom it may concern:*

Be it known that I, THOMAS C. WORMLEY, a citizen of the United States, residing at San Antonio, in the county of Bexar and State of Texas, have invented new and useful Improvements in Fumigators and Insect Destroyers, of which the following is a specification.

This invention relates to insect destroyers and has for its object the provision of a novel device designed for use particularly in fields of cotton for fumigating purposes and consequently destroying boll weevils, or in fact any and all other insects at any stage of their development.

An important object is the provision of a device of this character designed to have a fumigating candle burned therein, the device being provided with means for directing the fumes downwardly so as to cover the ground with a blanket of insecticide fumes which will positively kill out all insect life.

An additional object is the provision of a device of this character which will be simple and inexpensive in manufacture, easily portable, cheap to operate, efficient and durable in service and a general improvement in the art.

With the above and other objects and advantages in view the invention consists in the details of construction to be hereinafter more fully described and claimed and illustrated in the accompanying drawings, in which:

Figure 1 is a side elevation of the device,

Figure 2 is a longitudinal section therethrough and

Figure 3 is a horizontal section.

Referring more particularly to the drawings I have shown the device as comprising an elongated receptacle 10 which may be cylindrical or of any other desired shape and of any preferred material, galvanized iron being very suitable. This receptacle has a bottom 11 and a removable top 12 provided for the purpose of excluding rain. The top is provided with a handle 13 facilitating its removal and replacement and the receptacle is equipped with a carrying bail 14 to render it readily portable.

It is intended that a mixture of insecticide either in loose form or candle form be burned within this receptacle to produce fumes of such a nature to kill insects, either in the larva, pupa or adult stage. In the present instance I have shown a candle A disposed centrally upon the bottom and burnable to give off fumes.

It is of course necessary to supply a certain amount of oxygen to the interior of the receptacle for permitting combustion of the insecticide and for this reason I provide the receptacle with a plurality of holes 15 arranged at any desired height and at any preferred intervals, which holes may be of suitable size and of any preferred shape. Extending transversely of the shell or receptacle at an intermediate point therein is a partition 18 mounted in any desired manner and having a central opening 19 through which the fumes from the candle escape. For directing the fumes downwardly, the receptacle is provided at spaced points with downwardly and outwardly inclined radially extending nipples 16 within which are detachably engaged elongated tubes or pipes 17 which do not extend as far down as the bottom of the receptacle so that they will always terminate above the ground and not interfere with any lumps or stones thereon. For purpose of convenience in transportation and storage these tubes are made detachable though they might just as well for practical purposes be integral with the nipples 16 as there is no restriction in this respect.

In the actual use of the device it is necessary to employ several of them, probably four, located at suitable intervals apart for every acre though the number necessary and their distribution must naturally depend on the size of the device itself and its output of fumes. Irrespective of this detail it is obvious that when a candle, cake or loose mass of suitable insecticide is ignited and allowed to smolder within the receptacle there will be a large output of smoke or fumes which will pass out through the tubes and holes and flow upon the ground to form a blanket like mass of vapor or smoke thereover which will kill all varieties of insects within the area treated.

While I have shown and described the preferred embodiment of the invention it is of course to be understood that I reserve the right to make such changes in the form, construction and arrangement of parts as will not depart from the spirit of the invention or the scope of the subjoined claims.

Having thus described my invention I claim:

1. In a device of the character described, an open topped receptacle having a removable cover, the wall of the receptacle having air inlet openings near the bottom, the receptacle being designed to contain a combustible fume emitting disinfectant material, a plurality of downwardly inclined tubes permanently secured to the receptacle and extending radially therefrom and communicating with the interior thereof, and discharge tubes telescopically engaged upon said first named tubes and arranged to have their lower ends spaced slightly above the ground.

2. In a device of the character described, an open topped receptacle having a removable cover, the wall of the receptacle having air inlet openings near the bottom, the receptacle being designed to contain a combustible fume emitting disinfectant material, a plurality of downwardly inclined tubes permanently secured to the receptacle and extending radially therefrom and communicating with the interior thereof, and discharge tubes telescopically engaged upon said first named tubes and arranged to have their lower ends spaced slightly above the ground, and a partition plate extending transversely of the receptacle at an intermediate point and having an opening therein.

In testimony whereof I affix my signature.

THOMAS C. WORMLEY.